US006266109B1

(12) United States Patent
Yamaguchi et al.

(10) Patent No.: US 6,266,109 B1
(45) Date of Patent: Jul. 24, 2001

(54) LIQUID CRYSTAL OPTICAL SWITCHING ELEMENT IN WHICH THE LIQUID CRYSTAL MATERIAL OCCUPIES MORE THAN 50% OF THE MEDIUM

(75) Inventors: Hajime Yamaguchi; Yasushi Kawata, both of Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/170,280

(22) Filed: Oct. 13, 1998

(30) Foreign Application Priority Data

Oct. 16, 1997 (JP) ........................................ 9-283672
Sep. 30, 1998 (JP) ...................................... 10-279073

(51) Int. Cl.[7] ........................................... G02F 1/1333
(52) U.S. Cl. ................................ 349/86; 349/88; 349/89
(58) Field of Search ............................ 379/86, 88, 89, 379/100, 156

(56) References Cited

U.S. PATENT DOCUMENTS

| | | | | |
|---|---|---|---|---|
| 4,765,719 | * | 8/1988 | Fergason | 350/350 |
| 4,869,847 | * | 9/1989 | Leslie et al. | 252/299.01 |
| 5,084,203 | * | 1/1992 | Sansone et al. | 252/299 |
| 5,178,571 | * | 1/1993 | Mase | 445/24 |
| 5,194,972 | * | 3/1993 | Lim et al. | 359/94 |
| 5,404,245 | * | 4/1995 | Chahroudi | 359/289 |
| 5,583,673 | * | 12/1996 | Onishi et al. | 359/89 |
| 5,636,043 | * | 6/1997 | Uemura et al. | 359/81 |
| 5,867,238 | * | 2/1999 | Miller et al. | 349/92 |
| 5,877,829 | * | 3/1999 | Okamoto et al. | 349/74 |
| 5,889,907 | * | 3/1999 | Matsumoto et al. | 385/40 |
| 6,005,651 | * | 12/1999 | Takahara et al. | 349/137 |

OTHER PUBLICATIONS

Michael J. Sansone, et al., "Large Kerr Effects In Transparent Encapsulated Liquid Crystals," J. Appl. Phys. vol. 67, No. 9, May 1, 1990, pp. 4253–4259.

* cited by examiner

Primary Examiner—Kenneth Parker
Assistant Examiner—Mike Qi
(74) Attorney, Agent, or Firm—Oblon, Spivak, McClelland, Maier & Neustadt, P.C.

(57) ABSTRACT

A liquid crystal optical switching element comprising a pair of substrates disposed to face to each other with a space being interposed therebetween, a medium interposed between the pair of substrate and composed of a liquid crystal material partitioned into small sections, and a material for partitioning a region of the liquid crystal material into the small sections, and voltage-applying means to apply an voltage to the medium. This medium is optically isotropic at the moment when no voltage is applied to the medium and capable of exhibiting an optical anisotropy which is proportional to a square of electric field intensity when a voltage is applied to the medium.

12 Claims, 4 Drawing Sheets

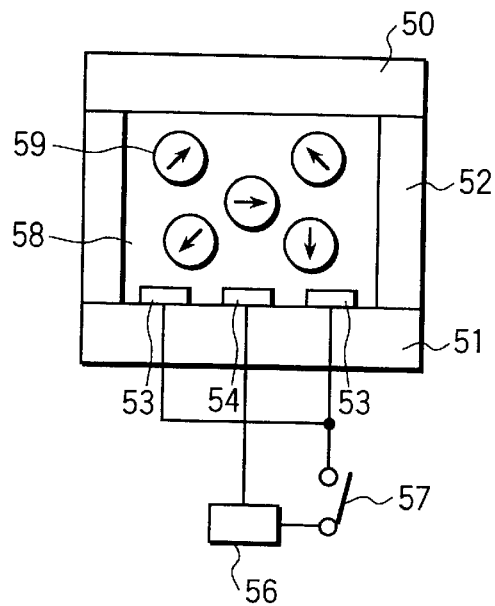 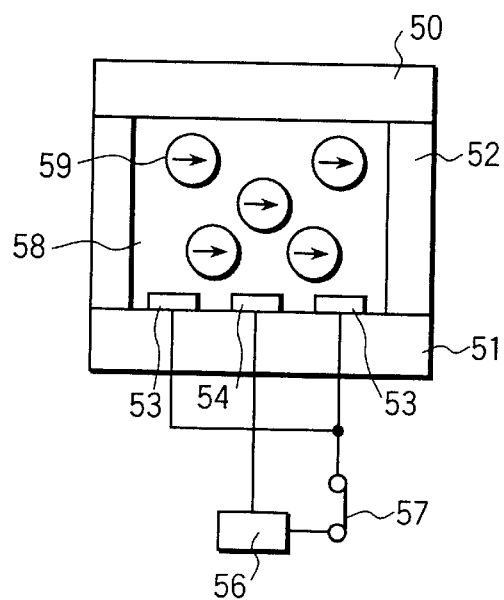
FIG. 1A  FIG. 1B
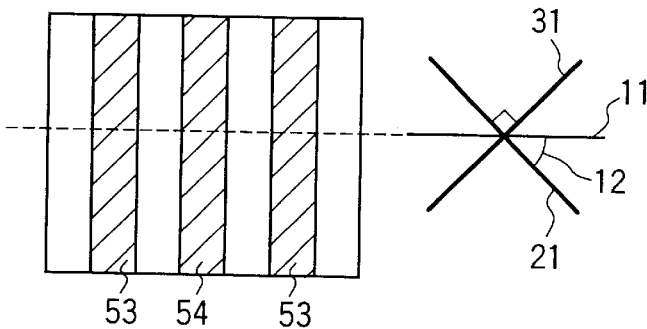
FIG. 2
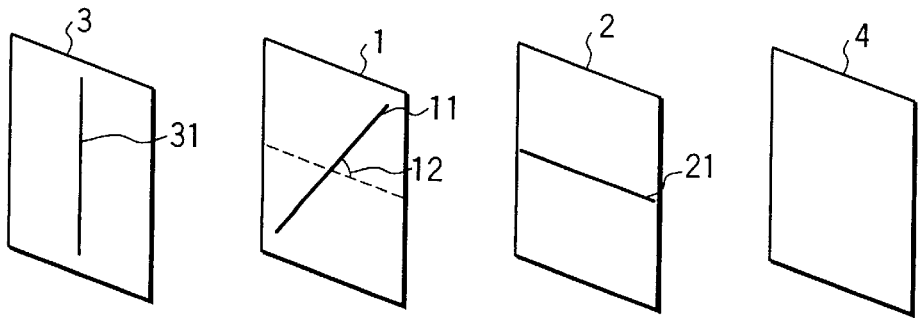
FIG. 3

LIQUID CRYSTAL OPTICAL SWITCHING ELEMENT IN WHICH THE LIQUID CRYSTAL MATERIAL OCCUPIES MORE THAN 50% OF THE MEDIUM

BACKGROUND OF THE INVENTION

This invention relates to a liquid crystal optical switching element, and in particular to a liquid crystal optical switching element which is suited for use for a color shutter and a color image display device.

Since a liquid crystal optical switching element is advantageous in terms of light weight and low power consumption, it has been developed and put into practical use as a display mainly for a notebook type personal computer or for a portable information processor. In view of advancements in transmitting information through multimedia in recent years, there is an increasing demand to make the most of optical switching element for an animation or for a large picture plane. In order to meet these demands for an animation or for a large picture plane, it is imperative to realize a liquid crystal optical switching element of high speed and wide viewing angle. Under the circumstances, there have been intensively studied various kinds of systems for realizing these demands, and some of which have been put into practice. Examples of systems that have been proposed up to date include a ferroelectric liquid crystal (FLC) element, an antiferroelectric liquid crystal (AFLC) element, an in-plane switching (IPS) element, a π cell element, a vertically aligned (VA) element, and a bistable twisted nematic (BTN) liquid crystal element. Among them, since the ferroelectric liquid crystal (FLC) element and antiferroelectric liquid crystal (AFLC) element exhibit a spontaneous polarization, it is possible according to these elements to obtain a high response speed ranging from several microseconds to several tens microseconds. In view of the fact that the response speed according to systems other than those of FLC element and AFLC element is at most 1 ms, these FLC and AFLC elements are more advantageous in terms of response speed. The systems employing these FLC and AFLC elements however are accompanied with a serious problem that they are subject to an irreversible breakdown of alignment due to an external stress.

On the other hand, there is known, as a high speed optical shutter that has been put into practical use, a device utilizing Kerr effect. The Kerr effect is a phenomenon where an optical anisotropy is exhibited as a voltage is applied on a transparent isotropic medium, the intensity of the optical anisotropy being proportional to a square of electric field E. This Kerr effect was found out by J. Kerr in 1875. Thus, when a birefringence to be induced by an electric field is represented by $\Delta n$ and a wavelength of light in vacuum is denoted by $\lambda$, there is a relationship between them which is represented by a formula; $\Delta n = K\lambda E^2$ wherein K is called Kerr constant. As for a material exhibiting a large Kerr constant, examples of which include a liquid such as carbon disulfide or nitrobenzene, and a solid such as PLZT (a metal oxide comprising a solid solution consisting of lead zirconate and lead titanate, into which lanthanum is further added). These materials can be utilized for an optical shutter in combination with a polarizer. For example, in the case of an optical shutter making use of an electric field of pulsed laser beam, it is possible to realize a response speed of 2 ps when carbon disulfide is employed (Appl. Phys. Lett. 26,92 (1975)), and a response speed of 32 ps when nitrobenzene is employed (Appl. Phys. Lett. 15,192 (1969)). However, since these materials are poisonous or explosive, it would be difficult to put them into practical use. On the other hand, an optical shutter employing the PLZT is now put into practical use, the response speed thereof being in the range of from 0.1 $\mu$s to 10 $\mu$s. The manufacture of a display element using the PLZT has also been tried as set forth in Ferroelectrics 50, 63 (1983); or SID 84 Digest, 137 (1984). However, the PLZT is inherently accompanied with a problem that the mechanical strength thereof is relatively poor and that it is difficult to make it into a display of large size.

Meanwhile, the aforementioned Kerr effect is also recognized in a liquid crystal. In particular, an isotropic phase thereof immediately over a nematic phase-isotropic phase transition temperature exhibits a Kerr effect which is equal to or higher than that of the PLZT. This high Kerr effect is called abnormal Kerr effect. This abnormal Kerr effect is assumably ascribed to the presence of the short-distance order of nematic molecular orientation in the isotropic phase. A liquid crystal shutter as well as a display which makes the most of Kerr effect are high in speed and free from the problems of insufficient mechanical strength of limited display area that have been accompanied with a display element employing the PLZT as mentioned above. Additionally, a liquid crystal shutter as well as a display which makes the most of Kerr effect are advantageous also in terms of viewing angle as compared with other kinds of liquid display system. However, the temperature dependence of Kerr effect becomes a serious problem in the utilization of this Kerr effect in a liquid crystal.

Generally, the Kerr constant of liquid crystal can be represented by a formula: $K=A/(T-T^*)$ (wherein A is a constant, and $T^*$ is approximately equal to a liquid crystal-isotropic phase transition temperature). As means to solve this problem of temperature dependence, the utilization of a nematic liquid crystal/a polymer composite has been proposed by Kikuchi et al (Kyushu University). Namely, the results of a test employing poly(isobutyl methacrylate) as a polymer material are reported by Kikuchi et al (Japanese Chemical Society, a draft for the 72nd Spring Meeting, pp. 226; or a draft for the 22nd Liquid Crystal Forum, pp. 413). However, the improvement of temperature dependence achieved therein is as small as several degrees centigrade at most, and there is still a problem that the Kerr constant may be markedly decreased with respect to a system consisting only of a liquid crystal.

On the other hand, it is also reported by Matsumoto et al (NTT) that if the diameter of droplet of liquid crystal in a nematic liquid crystal/polymer composite is set to 0.1 $\mu$m or less, a scattering state of liquid crystal can be controlled, and that the intensity of the optical anisotropy of a nematic liquid crystal/polymer composite to be induced by an electric field is proportional to a square of electric field, the response speed thereof being 10 $\mu$s or less (Appl. Phys. Lett., 69, 1044 (1996) and AM-LCD97, pp. 33). However, the Kerr effect is not referred to at all in this document. In particular, since the liquid crystal droplet having a diameter of 0.1 $\mu$m or less is realized by setting the content of liquid crystal to 40% by weight or less, the polymer region which is not optically responsive is caused to increase to 60% by weight or more, thus deteriorating the contrast of the element. Additionally, the temperature characteristics of the element is not referred to at all in this document. Accordingly, even if the Kerr effect is intended in this document, how degree the temperature dependence of Kerr effect can be improved is not clear in this document.

As mentioned above, even though there have been various attempts to make use of the Kerr effect of liquid crystal, it is still difficult to sufficiently improve the temperature dependence of Kerr effect. Namely, up to date, it still fails to fully make the most of the advantage of liquid crystal that the Kerr constant thereof is large.

Additionally, it is also desired to further enhance the light utilization efficiency in a liquid crystal shutter utilizing the Kerr effect.

BRIEF SUMMARY OF THE INVENTION

This invention has been made in view of solving the aforementioned problems and therefore, an object of this invention is to provide a liquid crystal optical switching element which is high in speed and wide in viewing angle.

Another object of this invention is to provide a liquid crystal optical switching element which is high in speed and in light utilization efficiency, and wide in viewing angle.

Namely, according to the present invention, there is provided a liquid crystal optical switching element comprising;

a pair of substrates disposed to face to each other with a space being interposed therebetween;

a medium interposed between the pair of substrate and composed of a liquid crystal material partitioned into small sections, and a material for partitioning a region of the liquid crystal material into the small sections; and voltage-applying means to apply an voltage to the medium;

wherein the medium is optically isotropic at the moment when no voltage is applied to the medium and capable of exhibiting an optical anisotropy which is proportional to a square of electric field intensity when a voltage is applied to the medium.

According to the present invention, there is further provided a liquid crystal optical switching element comprising;

a pair of substrates disposed to face to each other with a space being interposed therebetween;

a medium interposed between the pair of substrate and composed of a liquid crystal material partitioned into small sections, and a material for partitioning a region of the liquid crystal material into the small sections; and voltage-applying means to apply an voltage to the medium;

wherein an average diameter of each of the small sections of liquid crystal material is 0.1 $\mu$m or less, and the medium is optically isotropic at the moment when no voltage is applied to the medium.

According to the present invention, there is further provided a liquid crystal optical switching element comprising;

a pair of substrates disposed to face to each other with a space being interposed therebetween;

a medium interposed between the pair of substrate and composed of a liquid crystal material partitioned into small sections, and a material for partitioning a region of the liquid crystal material into the small sections; and voltage-applying means to apply an voltage to the medium;

wherein the liquid crystal material contains a liquid crystal and a coloring matter; and the medium is optically isotropic and absorbs a visible light at the moment when no voltage is applied to the medium, and, when a voltage is applied to the medium, is capable of exhibiting an optical anisotropy which is proportional to a square of electric field intensity and allows a visible light to pass therethrough.

According to the present invention, there is further provided a color shutter comprising any one of the aforementioned liquid crystal optical switching elements, and a color polarizer which is mounted in a light-transmitting direction of the liquid crystal optical switching element.

In the case of a liquid crystal optical switching element containing a coloring matter, it is possible to employ as a color shutter by a sole component.

According to the present invention, there is further provided a color image display device comprising the color shutter, and one or more image display elements which is mounted in a light-transmitting direction of the color shutter.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A and 1B are partial cross-sectional views each schematically illustrating the structure of a liquid crystal optical switching element according to this invention;

FIG. 2 is a diagram illustrating a relationship between a portion of arranged electrodes in a liquid crystal optical switching element according to this invention and the transmitting axis of polarizer;

FIG. 3 is a diagram schematically illustrating the construction of the liquid crystal optical switching element according to this invention;

DETAILED DESCRIPTION OF THE INVENTION

Figure 4:
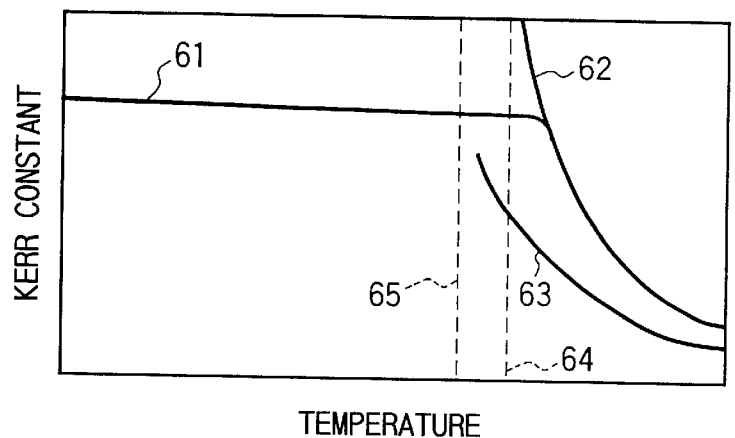
FIG. 4 is a graph illustrating a relationship between Kerr constant and temperatures.

This invention will be further explained in details as follows.

The present inventors have found as a result of intensive study on the Kerr effect of liquid crystal that if the region of liquid crystal material is partitioned into small sections by making use of a specific material, the temperature dependence of Kerr constant of liquid crystal can be depressed and at the same time, the Kerr constant of liquid crystal as a single component can be substantially maintained, thus accomplishing this invention.

As for the material for partitioning the region of liquid crystal material into small sections, a network polymer can be employed. More specifically, a polymer having in its molecule a mesogen moiety which is capable of interacting with a liquid crystal can be employed. In this case, the region of polymer can be controlled to 50% or less. In addition to a network polymer, it is also found possible to employ a microcapsule or a porous inorganic material for partitioning the region of liquid crystal into small sections thereby to manufacture an element with high controllability.

Namely, the liquid crystal optical switching element according to this invention is featured in that a medium sandwiched between a pair of substrates is constituted by a liquid crystal which is partitioned into small sections by making use of a specific material. First of all, this medium will be explained as follows.

As for the liquid crystal material to be employed for constituting the medium, there is not any particular limitation, i.e. it may be a single kind of liquid crystal, a mixture of plural kinds of liquid crystal, or a mixture containing a foreign material other than liquid crystal. However, in view of assuring a high Kerr effect and depressing the driving voltage, the liquid crystal to be employed should preferably be high in refractive anisotropy ($\Delta n$) and in dielectric anisotropy ($\Delta \epsilon$). Specifically, refractive anisotropy $\Delta n$ should preferably be 0.1 or more, more preferably 0.2 or more. On the other hand, dielectric anisotropy $\Delta \epsilon$ should preferably be 5 or more, more preferably 15 or more. Furthermore, in view of ensuring an excellent response speed, the liquid crystal to be employed should preferably be small in viscosity coefficient. Specifically, rotational viscosity coefficient $\gamma$ should preferably be 200 Pa·s or less, more preferably 150 Pa·s or less.

By the way, when a liquid crystal material is constituted by an inclusion of a coloring matter in addition to a liquid crystal in this invention, the refractive anisotropy ($\Delta n$) is not necessarily confined to the aforementioned range.

If a network polymer is to be employed as a material for partitioning the region of liquid crystal material into small sections, the physical property of the liquid crystal can be suitably selected depending on a particular kind of the network polymer. For example, the transition temperature $T_L$ of liquid crystal to an isotropic phase should preferably be 40° C. or more, more preferably 60° C. or more. Further, the transition temperature $T_S$ of liquid crystal to a solid phase should preferably be 5° C. or less, more preferably −10° C. or less.

On the other hand, in the case of a mixed liquid crystal comprising a liquid crystal and a microcapsule or a porous inorganic material, the characteristics of the mixed liquid crystal may differ from those of a single liquid crystal depending on the correlation length of liquid crystal. Therefore, the liquid crystal should preferably be selected such that the operating temperature range of the resultant element falls within the range of from 5° C. or less to 40° C. or more, more preferably from −10° C. or less to 60° C. or more.

The liquid crystal material according to this invention may contain a coloring matter in addition to a liquid crystal. When a coloring matter is included in the liquid crystal material, it is possible to combine the Kerr effect with a guest-host mode. Accordingly, it is possible to obtain a liquid crystal optical switching element exhibiting a high response speed provided by the Kerr effect and also exhibiting a high light utilization efficiency provided by the guest-host mode.

As for the coloring matter to be incorporated into the liquid crystal, there is not any substantial limitation as long as it is capable of being dissolved into the liquid crystal. However, in view of ensuring a sufficient contrast, it is preferably to employ a coloring matter which is high in dichroic ratio and in solubility in the liquid crystal. More specifically, the dichroic ratio of coloring matter should preferably be 5 or more, more preferably 10 or more.

As for yellow coloring matter to be employed in this invention, G232 (Japanese Research Institute for Photosensitizing Dyes Co., Ltd.), SI209 (OG Co., Ltd.) and D80 (Merck Co., Ltd.) are available. As for cyan coloring matter to be employed in this invention, SI501 (OG Co., Ltd.), SI497 (OG Co., Ltd.) and G472 (Japanese Research Institute for Photosensitizing Dyes Co., Ltd.) are available. As for magenta coloring matter to be employed in this invention, G176, G202, G239, G471 (all, Japanese Research Institute for Photosensitizing Dyes Co., Ltd.), and SI512 (OG Co., Ltd.) are available. A red coloring matter can be prepared by mixing any of the aforementioned magenta coloring matter with any of the aforementioned yellow coloring matter. Alternatively, D83 (Merck Co., Ltd.) may be employed as a red coloring matter. A green coloring matter can be prepared by mixing any of the aforementioned cyan coloring matter with any of the aforementioned yellow coloring matter. Alternatively, D84 (Merck Co., Ltd.) may be employed as a green coloring matter. A blue coloring matter can be prepared by mixing any of the aforementioned magenta coloring matter with any of the aforementioned cyan coloring matter. Alternatively, D102 (Merck Co., Ltd.) may be employed as a blue coloring matter. A black coloring matter can be prepared by mixing together the aforementioned yellow coloring matter, the aforementioned cyan coloring matter and the aforementioned magenta coloring matter. Alternatively, D85, D86 and D103 (all, Merck Co., Ltd.) may be employed as a black coloring matter.

As for the material for partitioning any of the aforementioned liquid crystal materials into small sections, there is not any particular limitation as long as it is capable of stably existed in the liquid material to be employed. The small sections of the liquid crystal material region may not necessarily be completely isolated from each other. The material for partitioning the liquid crystal material that can be employed in this invention can be selected from (1) a network polymer, (2) a microcapsule and (3) a porous inorganic material. In the followings, these materials are respectively explained.

Although there is not any particular limitation regarding the network polymer (a first material), a polymer which is excellent in compatibility with a liquid crystal (or with a coloring matter if it is employed) that will be mixed therewith can be preferably employed. For example, a network polymer having in its molecule a mesogen moiety can be preferably employed. It is also possible to employ a polymer liquid crystal for partitioning the liquid crystal material region.

As for the mesogen moiety, there is not any particular limitation, i.e. it is possible to employ phenyl group, biphenyl group, terphenyl group, phenylcyclohexyl group, biphenylcyclohexyl group, azobenzene group, azoxybenzene group, benzylidene aniline group, stilbene group or tolane group.

In addition to being excellent in compatibility with a liquid crystal material, the network polymer to be employed in this invention should preferably be capable of becoming a transparent solid body. A representative example of such a polymer is acrylic resin. Further, it is also possible to employ a polymer which can be obtained through a thermal or photo-polymerization of a polymeric monomer, or, in view of reactivity or viscosity, of an oligomer derived from monomers or of a mixture consisting of oligomers and monomers.

Further, in view of possibility of controlling a microscopic mixing condition of a polymer with a liquid crystal through a controlling of polymerization temperature, it is more preferable to employ a photo-setting resin as the polymer. As for the polymeric monomer or oligomer, it is preferable to employ those which can be cured by means of ultraviolet irradiation such as monoacryl monomer or oligomer, and diacryl monomer or oligomer. The hydrogen atom located at α-position and/or β-position of vinyl group may be substituted by phenyl group, alkyl group, halogen group or cyano group. For example, a compound having a structure represented by the following general formula (1) may be employed as a polymeric monomer.

$$R^1\text{-}S^1\text{-}M\text{-}S^2\text{-}R^2 \qquad (1)$$

wherein $R^1$ and $R^2$ in the general formula (1) are respectively a monovalent organic group selected from the following group with proviso that when $S^2$ is a monovalent organic group, $R^2$ is not existed:

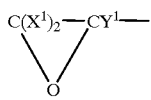

wherein $X^1$ and $Y^1$ are respectively a monovalent group selected from the following group:

H—, $CH_3(CH_2)_n$—,

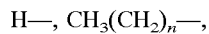, Cl

Br—, I—, F—, NC— and n is an integer;

$S^1$ and $S^2$ in the general formula (1) are respectively a bivalent organic group selected from the following group with proviso that $S^2$ may be hydrogen atom or a monovalent organic cyano group:

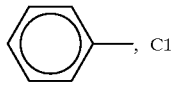

wherein n is an integer of 0 to 16;

M in the general formula (1) is a bivalent organic group selected from the following group:

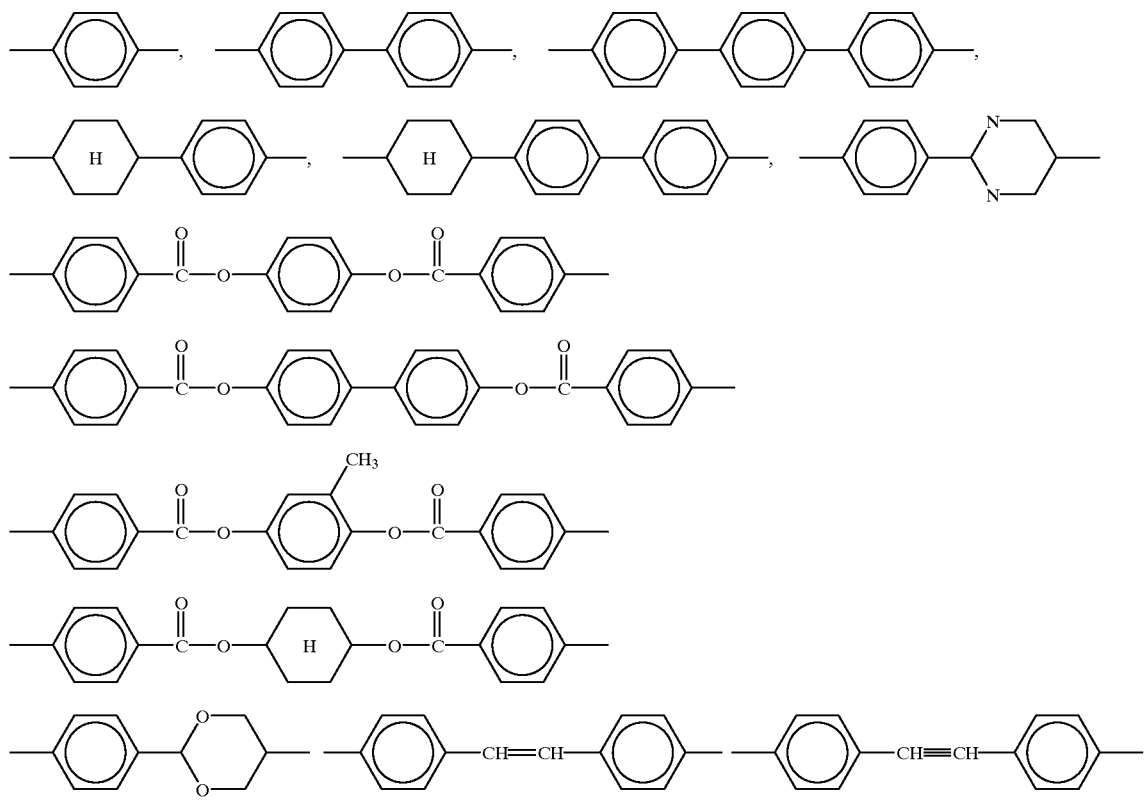

-continued

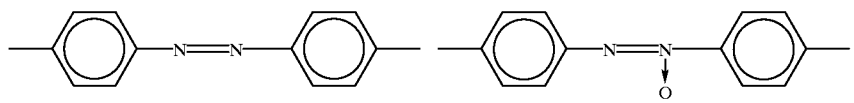

It is also possible to employ a polymeric monomer which is easily commercially available, e.g. Kayarad R-551, Kayarad R-712 (all available from Nippon Kayaku Co., Ltd.), NOA60, NOA61, NOA63, NOA65, NOA68, NOA71, NOA72, NOA73, NOA81, NOA83H and NOA88 (all available from Norland Co., Ltd.).

It is also possible to employ a photo-polymerization initiator for the purpose of promoting the polymerization of the aforementioned monomers or oligomers thereby to obtain a desired polymer. As for the photo-polymerization initiator, it is also possible to employ those which are commercially available, e.g. Darocure 1173, Darocure 1116 (all available from Merck Co., Ltd.), Irgacure 184, Irgacure 651, Irgacure 907 (all available from Ciba Geigy Co., Ltd.), Kayacure DETX and Kayacure EPA (all available from Nippon Kayaku Co., Ltd.).

In order to increase the polymerization speed and to make smaller the diameter of the droplet of liquid crystal material than the wavelength of visible light, the absorbance of the photo-polymerization initiator should preferably be enhanced. Even though it depends on the shape of absorption spectrum, the absorbance of the photo-polymerization initiator should preferably be such that the molar absorption coefficient at a wavelength of 350 nm is 500 ($1 \cdot mol^{-1} \cdot cm^{-1}$) or more. The ratio of the photo-polymerization initiator should preferably be 5% by weight or less, more preferably be 0.5% by weight or less based on the amount of monomers or oligomers in view of ensuring a high voltage-holding ratio of the liquid crystal material. If required, a modifier such as a cross-linking agent, a surfactant, a polymerization promoter, a chain-transfer agent or a photosensitizer may be incorporated into the polymeric monomers or oligomers.

The medium of the liquid crystal optical switching element according to this invention comprising any of the aforementioned network polymers and a liquid crystal should preferably be transparent. As long as the medium takes a transparent isotropic state at the moment when no voltage is applied thereto, the method of manufacturing the switching element is not restricted in any way. The liquid crystal optical switching element according to this invention differs markedly from the so-called polymer dispersed liquid crystal (PDLC) in the respect that it does not utilize a scattered state but utilizes a transparent state at the moment when no voltage is applied thereto. In order to achieve this transparent state of the medium while suppressing a scattered state thereof, the diameter of the droplet of liquid crystal material is required to be made smaller than the wavelength of visible light. Accordingly, the diameter of the droplet of liquid crystal material according to this invention is limited to 0.1 μm or less. Namely, if the diameter of the droplet of liquid crystal material exceeds over 0.1 μm, it is impossible to suppress the generation of scattered state, thus failing to achieve the object of this invention.

In order to restrict the diameter of the droplet of liquid crystal material to 0.1 μm or less and at the same time, to assure a high content of liquid crystal, the polymer existing inside the liquid crystal material is required to be effectively distributed. For this purpose, after a mixture containing a polymeric monomer or oligomer and a liquid crystal material is sandwiched between a pair of substrates, the monomer or oligomer should preferably be subjected to a photo-polymerization. In this case, the light irradiation should be intensified so as to accelerate the polymerization speed, thereby making it possible to realize a transparent state of the medium without bringing about a light scattering state and at the same time to depress the temperature dependence of Kerr constant. Additionally, by controlling the polymerization temperature of medium, the structure of medium can be precisely controlled. There is not any particular limitation regarding the method of sandwiching the medium between a pair of substrates, i.e. ordinary methods such as a vacuum injection, a suction injection or a coating method may be employed.

As for the microcapsule (a second material) to be employed for partitioning the liquid crystal material region into small sections, there is not any particular limitation as long as a liquid crystal material can be stably enclosed therein and the microcapsule is transparent to the visible light. The microcapsule may be constituted by a plurality of components. For example, it is possible to employ, as the material for the microcapsule, an addition polymer such as polystyrene, styrene-vinylbenzene copolymer, methyl polymethacrylate, polyacrylonitrile, polybutadiene, polyisoprene, polytetrafluoroethylene and polyvinyl alcohol; a condensation polymer such as polyamide such as nylon 66, polyimide, polyurethane, polyester and polyether imide; and a natural polymer such as gum arabid, gelatin, natural rubber and cellulose.

Preferably, a material which is three-dimensionally cross-linked and hence excellent in heat resistance is preferable as a material for the microcapsule. The dielectric constant of material for the microcapsule should preferably be sufficiently high in view of minimizing the voltage drop at the microcapsule so as to lower the operation voltage. The size of the microcapsule should preferably be set to such that an average diameter of liquid crystal material to be enclosed in the capsule becomes 0.1 μm or less in view of ensuring an excellent temperature characteristic of optical anisotropy to be induced by a voltage, and at the same time in view of depressing the scattering thereof. If the thickness of the microcapsule is too large, a region which does not response to a voltage would be excessively enlarged, thus deteriorating the contrast of display. Whereas, if the thickness of the microcapsule is too thin, it is difficult to obtain a sufficient mechanical strength thereof. Therefore, in order to ensure a high contrast and a high mechanical strength, the thickness of the microcapsule should preferably be set to 3 to 15% of the diameter of the microcapsule.

There is not any particular limitation regarding the manufacturing method of the microcapsule, i.e. any conventional method may be suitably selected depending on the kind of liquid crystal material to be employed. For example, a chemical method such as an interfacial polymerization method, an in-situ polymerization method or a submerged cure-coating method; or a physicochemical method such as a coacervation method utilizing a phase separation, an interfacial precipitation method (a submerged concentration method, a submerged drying method or a secondary emulsion method) or a melt dispersion method may be employed.

The method for sandwiching the aforementioned microcapsule enclosing a liquid crystal material may be suitably selected depending on the kind of material employed. For example, the microcapsule can be sandwiched by injecting the microcapsule into a space between a pair of substrates. Alternatively, after a paste is prepared by dispersing the microcapsule in a solvent, the resultant paste may be coated on the substrate, thus allowing the solvent to evaporate before the substrates are laminated to sandwich the microcapsule.

As for the porous inorganic material (a third material) to be employed for partitioning the liquid crystal material region into small sections, there is not any particular limitation as long as the porous inorganic material is transparent to the visible light. The porous inorganic material according to this invention should preferably be such that an average pore size thereof is 0.1 $\mu$m or less and the porosity thereof is as high as possible in order to ensure a high content of liquid crystal material and a low operating voltage. The thickness of the porous inorganic material may be in the range of 0.5 to 10 $\mu$m in general, though a specific thickness thereof can be suitably selected depending on a voltage to be applied. Specifically, a porous glass can be employed as the porous inorganic material.

The preparation of such a porous inorganic material or of a porous inorganic material containing a liquid crystal material therein may be carried out by known methods as set forth on page 238 of the draft for the fourth Forum on Polymer Materials, or on page 296 of the draft for FLC 97.

As for the electrode for applying a voltage on a medium containing the aforementioned liquid crystal material in the liquid crystal optical switching element of this invention, there is not any particular limitation. For example, a thin film of ITO (indium tin oxide) may be employed. With regard to an electrode where transparency thereof is not demanded, various kinds of electrode material such as aluminum, nickel, copper, silver, gold or platinum may be employed. The formation of an electrode on a substrate may be carried Qut by means of an ordinary method such as vapor deposition, sputtering or photolithography.

As for the substrate for sandwiching the aforementioned medium therebetween in the liquid crystal optical switching element of this invention, there is not any particular limitation as long as the substrate is provided with a sufficient strength and insulation property, and provided that one of the substrates which is disposed on the observer's side is transparent. For example, glass, plastics or ceramics may be employed.

The aforementioned electrode may be provided on its surface with an insulating thin film. As for the material for the insulating thin film, there is not any particular limitation as long as it is inert to and insoluble in a liquid crystal material to be employed and also it is of electrically insulating property. For example, it is possible to employ, as an insulating thin film, an organic material such as polyimide, polyamide, polyvinyl alcohol, polyacryl amide, cyclized rubber, novolak resin, polyester, polyurethane, acrylic resin, bisphenol resin and gelatin; or an inorganic material such as silicon oxide and silicon nitride.

The insulating thin film can be formed by any desired method depending on the material employed. For example, a spin-coating method or Langmuir Blodgett's technique wherein a monomoleculare film formed on the surface of water is transferred to and laminated on the surface of an electrode substrate thereby to form a thin film may be employed. Alternatively, a vapor deposition method may be employed to form an insulating thin film. Although there is not any particular limitation as to the thickness of the thin film as long as the thickness thereof falls within the range which enables to sufficiently perform the application of voltage onto a liquid crystal layer, the thickness thereof should preferably be as thin as possible in view of realizing a low voltage operation, provided that the insulating property thereof is not substantially deteriorated. Although an aligning treatment to the insulating thin film is not necessarily required, an aligning treatment such as rubbing may be conducted to the insulating thin film if desired.

If a more accurate controlling of the distance between a pair of substrates is desired in this invention, a spacer may be interposed between a pair of substrates. The disposition of the spacer may be performed by spraying a spherical spacer onto the surface of the substrate in the same manner as conventionally performed. Alternatively, a columnar spacer may be formed on the surface of the substrate at predetermined intervals. If the disposition of the spacer is performed by the latter method, a possibility of causing neighboring spacers to come close to each other can be avoided, thus making it possible to uniformly distribute the spacer throughout the plane of substrates.

As for the material of spacer sprayed on the surface of substrate among the aforementioned various kinds of spacer, there is not any particular limitation as long as the material is provided with insulating property, is inert to and insoluble in a liquid crystal to be employed and is capable of being stably distributed on the surface of substrate. For example, a polymer such as divinyl benzene and polystyrene; or an inorganic oxide such as alumina and silica may be employed as such a spacer. Irrespective of the kind of material to be employed, the distribution of grain diameter of the spacer should desirably be as narrow as possible.

On the other hand, when a columnar spacer is to be formed at predetermined intervals on the surface of electrode substrate, it can be performed by making use of an ordinary method employing photolithography. As for the material for preparing the columnar spacer, an electrically insulating positive or negative photo-sensitive resin which is inert to and insoluble in the liquid crystal material can be employed. For example, it is possible to employ various kinds of photo-sensitive material which can be obtained by photo-sensitizing organic materials such as polyimide, polyamide, polyvinyl alcohol, polyacryl amide, cyclized rubber, novolak resin, polyester, polyurethane, acrylic resin, bisphenol resin and gelatin. Among them, a negative photo-sensitive polyimide is most preferable in general.

When a liquid crystal material containing no coloring matter is to be employed in the liquid crystal optical switching element of this invention, the direction of electric field to the medium is required to be substantially orthogonal to the direction of observing the element. Namely, a voltage is applied in a direction which is substantially orthogonal to the light-transmitting direction of the liquid crystal optical switching element. To achieve this applying manner of voltage, an interdigitated electrode for example is disposed on one of two substrates facing to each other. Further, in view of ensuring a high transmittance demanded of the optical switching element, the angle between the direction of electric field and the transmitting axis of the polarizer should preferably be set to 45°.

A color shutter can be constituted by a combination of the aforementioned liquid crystal optical switching element and a color polarizer which is disposed in the light-transmitting direction of the optical switching element. The color polarizer to be employed in this case may not be limited in terms of material to be employed. However, in view of realizing a display which is bright and excellent in contrast, the material for the polarizer should preferably be high in transmittance of the transmitting component thereof and low in transmittance of the non-transmitting component thereof. This color polarizer may be prepared by making use of commercially available materials or by means of ordinary method wherein a polymer such as polyvinyl alcohol is impregnated with a dichroic dye and then subjected to drawing.

When a liquid crystal material containing a coloring matter is to be employed in the liquid crystal optical switching element of this invention, an electric field which is perpendicular to the light-transmitting direction, i.e. so-called lateral electric field is no more required to be applied thereto. Since the Kerr effect is applied to a guest-host mode where the absorption and transmittance of light are performed through the controlling of the orientation of coloring matter by means of electric field, an ordinary arrangement of electrode can be adopted in this case. Namely, a voltage can be applied in a direction which is substantially parallel with the light-transmitting direction of the liquid crystal optical switching element. More specifically, an electrode is formed on the surface of each of the pair of substrates arranged to spacingly face to each other, and then a voltage is applied between these electrodes. By the way, the application of the Kerr effect to a guest-host mode in this invention is not intended to mean the utilization of the birefringence to be derived by the Kerr effect, but is intended to mean the application of a high speed switching phenomenon between an optically isotropic state and an optically anisotropic state to a guest-host mode, and hence is a novel concept.

The liquid crystal optical switching element constructed in this manner can be employed as a color shutter without arranging an optical polarizer, and is advantageous in the respect that the light utilization efficiency can be enhanced. In this case, plural liquid crystal optical switching elements, each sandwiching a coloring matter which is capable of absorbing a visible light of different wavelength, may be stacked in the light-transmitting direction thereby to constitute a color shutter. For example, plural elements which are capable of controlling the transmittance of three primary colors, i.e. red, green and blue; or cyan, magenta and yellow may be laminated thereby producing a color filter. Furthermore, it is also possible to prepare a color image display device by combining an image information-input means with the liquid crystal optical switching element.

It is also possible to prepare a color image display device by combining the aforementioned color shutter with one or more image display elements which are to be disposed in the light-transmitting direction of the color shutter. As for the image display element, there is not any particular limitation as long as it is capable of outputting at least monochrome binary image. For example, an electron beam fluorescent tube, a liquid crystal image display element, a light emitting diode image display element, a field emission image display element may be employed. Among them, an electron beam fluorescent tube of monochrome type which is provided with a mixed fluorescent substance of red, green and blue is most suited for use in view of manufacturing cost, brightness and gray scale. It is also possible to combine a plurality of small image display devices to each other thereby to manufacture a large image display device.

In the foregoings, the liquid crystal optical switching element according to this invention has been explained by referring to a transmission type device. However, this invention is not restricted to such a transmission type device, but also applicable to a reflection type device. In the case of reflection type device, a reflector is mounted behind the liquid crystal optical switching element as viewed from an observer.

According to this invention, since the medium to be sandwiched between a pair of substrates is constituted by a liquid crystal material which is partitioned into small sections by making use of a specific material, it is possible to obtain a liquid crystal optical switching element which is high in speed and wide in viewing angle. In particular, the liquid crystal optical switching element according to this invention is featured in that it is not designed to utilize a scattered state, but designed to utilize a switching between two states, i.e. a transmitted state at the moment when no voltage is applied and a birefringent state at the moment when a voltage is applied. Therefore, the liquid crystal optical switching element according to this invention differs in display principle from the polymer dispersed liquid crystal (PDLC) where a liquid crystal material/polymer composite is employed and a switching between two states, i.e. a scattered state at the moment when no voltage is applied and a transmitted state at the moment when a voltage is applied, is utilized.

Further, since an average diameter of the droplet of liquid crystal material is limited to 0.1 $\mu$m or less in the liquid crystal optical switching element according to this invention, the scattering of visible light can be suppressed and at the same time a correlation length between liquid crystal molecules can be depressed, thus making it possible to improve the temperature dependence of the Kerr effect.

Furthermore, when a coloring matter is mixed into a liquid crystal thereby to formulate a liquid crystal material, it is possible to obtain an advantage of an increased light utilization efficiency which is inherent to the guest-host mode.

The liquid crystal optical switching element according to this invention and the switching thereof will be further explained in detail with reference to drawings.

EXAMPLE I

FIGS. 1A and 1B are partial cross-sectional views each schematically illustrating the structure of a liquid crystal optical switching element according to this invention. This embodiment shown herein is a case where an interdigitated electrode which is employed as an electrode is disposed on the surface of one of the substrates, and where a liquid crystal and a network polymer are employed as a medium. Namely, the liquid crystal material is constituted by a liquid crystal containing no coloring matter. By the way, there is not any particular limitation with respect the electrode to be employed and the manner of its arrangement as far as the direction of electric field to be applied onto the medium containing both network polymer and liquid crystal is directed orthogonal to the transmitting direction of light, i.e. the observing direction of the element.

First of all, the structure of liquid crystal optical switching element according to this invention and the manner of controlling of the optical characteristics of the optical switching element with an application of voltage will be explained with reference to FIGS. 1A and 1B. FIG. 1A shows a state of medium at the moment when no voltage is applied thereon, while FIG. 1B shows a state of medium at the moment when a voltage is applied thereon.

As shown in FIG. 1A, the medium 58 containing a polymer and a liquid crystal material is sandwiched between a substrate 51 provided with electrodes 53 and 54 and a substrate 50 which is disposed to face the substrate 51 and spaced apart from the substrate 51. The distance between these two substrates 50 and 51 is maintained by means of a spacer 52. The application of voltage to the medium 58 is performed through the electrodes 53 and 54 by means of an electric circuit 56 and a switch 57.

At the moment when no voltage is applied as shown in FIG. 1A, the medium 58 containing a polymer and a liquid crystal material is postured, when macroscopically observed, to take an optically isotropic phase. However, when it is microscopically observed, a large number of micro-regions 59 which are well aligned in orientation of the liquid crystal molecule can be recognized even though the correlation length thereof is relatively short. As shown in FIG. 1A, although the alignment direction of each of these micro-regions 59 is random, the generation of scattering of light is not recognized at the moment when no voltage is applied thereon, since the size of this micro-region 59 is sufficiently smaller than the wavelength of the visible light.

At the moment when a voltage is applied, as shown in FIG. 1B, the alignment direction of each of these micro-regions 59 is aligned in the direction of electric field, thus rendering the medium 58 to turn into an optically anisotropic phase. This large number of micro-regions 59 whose alignment direction is random are assumed to be formed by a mechanism as explained below.

Namely, since the network polymer interact strongly with a liquid crystal molecule, the polymer can be uniformly mixed with the liquid crystal on a molecular scale. Therefore, the correlation length between liquid crystal molecules is caused to prominently decreased, thus rendering the medium to take an isotropic phase as macroscopically observed even if the medium is of liquid crystal structure as observed microscopically.

Next, the controlling of transmitting light in the liquid crystal optical switching element according to this invention will be explained with reference to FIGS. 2 and 3. FIG. 2 illustrates a view, as observed from the other substrate side, of the surface of the substrate 51 on which the interdigitated electrodes 53 and 54 are mounted, wherein the transmission axes 21 and 31 of a polarizer (indicated by reference number 2 and 3 in FIG. 3) to be employed and the optical axis 11 are also shown therein.

FIG. 3 is a diagram illustrating a positional relationship among the liquid crystal optical switching element, the polarizer and the light source. The purpose of FIG. 3 is to illustrate the switching of transmitting light. In the case of switching a reflecting light, a reflector may be disposed in place of the light source.

As shown in FIG. 3, a first polarizer 2 and a second polarizer 3 are arranged in the direction of transmission axis of the liquid crystal optical switching element 1 of this invention, and the liquid crystal optical switching element 1 is interposed between these two polarizers 2 and 3. By the way, the transmission axis 21 of the first polarizer 2 is postured to orthogonally intersect with the transmission axis 31 of the second polarizer 3 as shown in FIG. 2. Further, a light source 4 is arranged on a side of the first polarizer 2, which is opposite to where the liquid crystal optical switching element 1 is disposed.

In this structure, the light emitted from the light source 4 enters at first into the first polarizer 2, and only the polarized light having a plane of polarization which is parallel with the transmission axis 21 is allowed to pass through the first polarizer 2 thereby entering into the liquid crystal optical switching element 1. Since the liquid crystal optical switching element 1 is being optically isotropic at the moment when no voltage is applied thereon, the polarized light is allowed to pass through the liquid crystal optical switching element 1 and then to enter into the second polarizer 3.

As mentioned above, since the transmission axis 31 of the second polarizer 3 is intersected orthogonally with the transmission axis 21 of the first polarizer 2, the polarized light which is passed through the liquid crystal optical switching element 1 and parallel with the transmission axis 21 cannot pass through the second polarizer 3. As a result, the display becomes black at the moment when no voltage is applied thereon.

As explained with reference to FIG. 1B, when a voltage is applied, the liquid crystal optical switching element 1 is turned to take an optically anisotropic phase. When an angle 12 between the optical axis 11 and the transmission axis 21 of the first polarizer 2 is defined as α, the intensity of outgoing beam from the second polarizer 3 can be represented by the following formula.

$$I/I_0 = \{\sin 2\alpha \sin(\pi \Delta n d / \lambda)\}^2$$

Wherein $\Delta n$ denotes an optical anisotropy of the transparent medium 58; d is a thickness of the transparent medium 58; $\lambda$ is a wavelength of light in vacuum; and $I_0$ is the intensity of incoming beam into the liquid crystal optical switching element 1.

In order to obtain a liquid crystal optical switch of bright and high contrast, the arrangement of the polarizer, the intensity of electric field to be applied and the thickness of the medium may be adjusted so as to achieve the conditions of: $\alpha = 45°$; and $\Delta n d = \lambda/2$.

When the aforementioned conditions are met, the linear polarized light entering into the liquid crystal optical switching element 1 is completely converted into a linear polarized light whose polarization direction is rotated by 90°.

Next, the relationship between the Kerr constant and temperature will be explained with reference to the graph shown in FIG. 4. In this graph, the solid line 61 is a curve representing the liquid crystal optical switching element according to this invention; the solid line 62 is a curve representing a transparent medium consisting only of a liquid crystal according to the prior art; the solid line 63 is a curve representing the prior art (the 22nd Liquid Crystal Forum, pp. 413); the broken line 64 is a nematic phase-isotropic phase transition temperature of a liquid crystal per se; and the broken line 65 is a nematic phase-isotropic phase transition temperature according to the prior art (the 22nd Liquid Crystal Forum, pp. 413).

The curve 61 indicates clearly that the Kerr effect can be developed even in a temperature region where the Kerr effect of the nematic phase cannot be obtained according to the prior art. The reason for this is assumed to be attributed to the fact that since the medium is constituted by the inclusion of a polymer having a mesogen moiety which is capable of interacting with a liquid crystal, the correlation length between the liquid crystal molecules is no more dependant on temperatures. Specifically, it was possible, even in a temperature region where a liquid crystal is turned into a nematic phase when the liquid crystal was employed as a sole component, to restrict the correlation length between the liquid crystal molecules to nearly the correlation length in a narrow temperature region of isotropic phase exhibiting abnormal Kerr effect. Therefore, it was possible to maintain an isotropic phase as viewed macroscopically while retaining a liquid crystal phase as viewed microscopically.

The liquid crystal optical switching element according to this invention can be employed for the manufacture of a color image display device by combining it with a color polarizer and a monochrome electron beam fluorescent tube. The display mechanism of such a color image display device will be explained with reference to FIG. 5.

Figure 5:
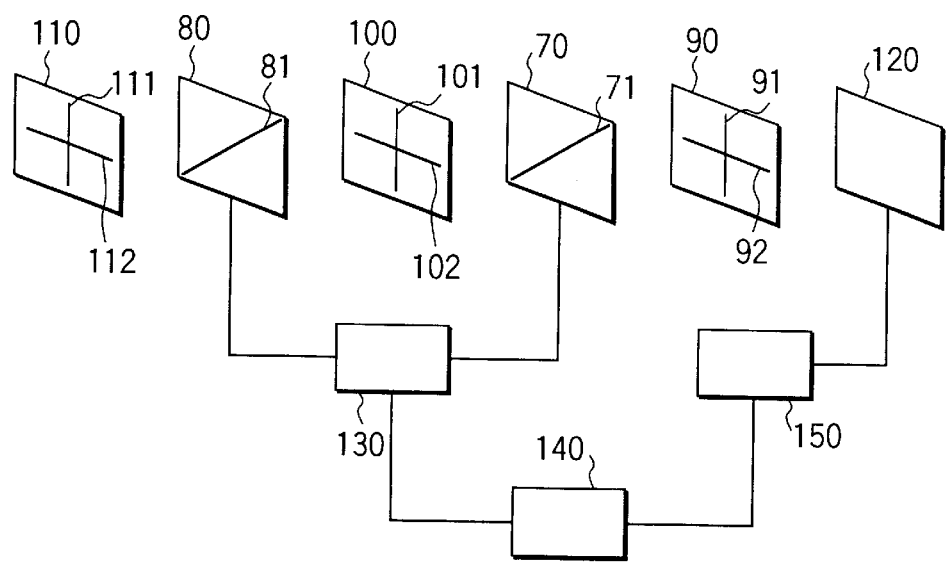
FIG. 5 is a block diagram schematically illustrating one example of the color image display device according to this invention.

In the structure shown in FIG. 5, a monochrome electron beam fluorescent tube 120, a first color polarizer 90, a first liquid crystal optical switching element 70, a second color polarizer 100, a second liquid crystal optical switching element 80, and a third color polarizer 110 are sequentially disposed in the mentioned order. The first liquid crystal optical switching element 70 and the second liquid crystal optical switching element 80 are connected with a control circuit 130, while the monochrome electron beam fluorescent tube 120 is connected with a raster generator 150. Further, for the purpose of synchronizing with the control circuit 130 and the raster generator 150, a synchronous circuit 140 is connected with these control circuit 130 and raster generator 150.

A pair of transmission axes 91 and 92 formed in the first color polarizer 90 and intersecting orthogonally to each other enable a red polarized light and a white polarized light to pass therethrough, respectively, while a pair of transmission axes 101 and 102 formed in the second color polarizer 100 and intersecting orthogonally to each other enable a green polarized light and a white polarized light to pass therethrough, respectively. Further, a pair of transmission axes 111 and 112 formed in the third color polarizer 110 and intersecting orthogonally to each other enable a blue polarized light and a white polarized light to pass therethrough, respectively. Among these transmission axes, three transmission axes 91, 101 and 111 are parallel with each other, while three transmission axes 92, 102 and 112 are also parallel with each other.

In FIG. 5, the reference numerals 71 and 81 indicate the optical axial direction, at the moment when a voltage is applied, of the first liquid crystal optical switching element 70 and of second liquid crystal optical switching element 80, respectively. These optical axial directions 71 and 81 are parallel with each other, and at the same time, are formed such a manner that the angle thereof in relative to the transmission axis of each of polarizers 90, 100 and 110 becomes 45°. Additionally, these optical axial directions 71 and 81 are set such that a retardation $\Delta nd$ becomes $\lambda/2$ at the moment when a voltage is applied.

Then, the transmission of light when the first liquid crystal optical switching element 70 is not applied with voltage and the second liquid crystal optical switching element 80 is applied with a voltage will be explained hereinafter.

The white light emitted from the monochrome electron beam fluorescent tube 120 is separated by means of the first polarizer 90 into a red linear polarized light which is parallel with the transmission axis 91 and a white linear polarized light which is parallel with the transmission axis 92. Since the first liquid crystal optical switching element 70 is not applied with voltage at this moment, the incoming linear polarized light is allowed to pass through the first liquid crystal optical switching element 70 without being subjected to a phase modulation.

The linear polarized light transmitted to the second color polarizer 100 is composed of two kinds of light, i.e. a red light which is parallel with the transmission axis 101 and a white light which is parallel with the transmission axis 102. Since the transmission axis 101 permits only the green linear polarized light to pass therethrough, the red light included in the linear polarized light that has been transmitted to the second color polarizer 100 cannot pass therethrough. On the other hand, since the transmission axis 102 of this color polarizer permits the white linear polarized light to pass therethrough, the white light transmitted to the second color polarizer 100 is allowed to pass therethrough. Namely, the linear polarized light outgoing from the second color polarizer 100 is limited to the white light which is parallel with the transmission axis 102 and hence a light which is parallel with the transmission axis 101 is not allowed to outgo.

Since the second liquid crystal optical switching element 80 is capable of converting a linear polarized light transmitted therein at the moment when a voltage is applied thereon into a linear polarized light which has been rotated by 90°, a white linear polarized light which is parallel with the transmission axis 102 is caused to rotate 90° and then transmitted, as a linear polarized light which is parallel with the transmission axis 111, to the third color polarizer 110. On the other hand, a light which is parallel with the transmission axis 112 is not existed, so that the light to be transmitted from the third color polarizer 110 is limited to the blue linear polarized light which is parallel with the transmission axis 111. In this case, a blue color is displayed.

The following Table 1 shows a summary illustrating the relationship between the ON/OFF of voltage to the liquid crystal optical switching elements 70 (lst LCOSE) and 80 (2nd LCOSE) of this invention which are constructed as shown in FIG. 5 and the display color.

TABLE 1

| 1st LCOSE | 2nd LCOSE | Display color |
| --- | --- | --- |
| ON | ON | Green |
| ON | OFF | Red |
| OFF | ON | Blue |
| OFF | OFF | White |

As explained above, through the synchronization of the raster generator 150 connected with the monochrome electron beam fluorescent tube 120 with the control circuit 130 of the first liquid crystal optical switching element 70 and of the second liquid crystal optical switching element 80 by making use of the synchronous circuit 140, the selection of display color as well as the generation of monochrome image can be performed, and at the same time, through the switching of display colors at high speed, the display of color images can be achieved.

By the way, the selection of color polarizer and the arrangement of the transmission axis of each color polarizer in the color image display device of this invention are not limited to the embodiment shown in FIG. 5, but may be suitably modified.

This invention will be further explained with reference to the following specific examples.

Example I-1

First of all, a MoW interdigitated electrode 10 $\mu$m in width of electrode and 20 $\mu$m in intervals of electrode was formed by means of ordinary method on the surface of one glass substrate (0.7 mm in thickness). Then, polyimide (AL-1051: JSR Co., Ltd.) was deposited through casting on the surface, bearing electrode, of the substrate to a thickness of 70 nm by making use of a spinner, thus forming an insulating film thereby to manufacture a first substrate. Likewise, a similar insulating film was deposited on the surface of the other glass substrate (0.7 mm in thickness) in the same manner as explained above thereby to manufacture a second substrate.

Then, an epoxy adhesive was coated on predetermined position of the surface of the insulating film formed on the second substrate for laminating it with the first substrate. On the other hand, resin spacer balls each having a diameter of 5 $\mu$m was distributed all over the surface of the insulating film of the first substrate. Thereafter, these first and second substrates were superimposed with the insulating films thereof being faced to each other, and then sealed thereby to obtain a liquid crystal cell.

On the other hand, 60 wt % of a nematic liquid crystal BL 035 (Merck Co., Ltd.) and 40 wt % of a polymeric monomer:

1,4-di(4-(6-(acryloyloxy)hexyloxy)benzoyloxy)-2-methyl benzene were mixed together to obtain a mixed solution, to which 0.5 wt % (based on the aforementioned polymeric monomer) of a polymerization initiator: Irgacure 651 (Ciba Geigy Co., Ltd.) was added thereby to prepare a mixture.

The mixture thus obtained was introduced into the aforementioned liquid crystal cell by means of a conventional method, and then ultraviolet rays were irradiated onto the liquid crystal cell by making use of a high pressure mercury lamp while keeping the aforementioned mixture in a state of isotropic phase. In this irradiation, the intensity of irradiated light was set to 100 mW/cm$^2$ (365 nm) and the irradiation time was set to one minute.

Then, a couple of polarizers were stuck on the top surface and bottom surface of the liquid crystal cell in such a manner that the angle between the direction of electric field to be applied and the transmission axes of the polarizers becomes 45° and at the same time, the transmission axes thereof intersect orthogonally with each other, thereby accomplishing a liquid crystal optical switching element as shown in FIGS. 1A to 3.

In the liquid crystal optical switching element obtained in this manner, the medium sandwiched between a pair of electrodes was constituted by a liquid crystal which was partitioned by means of a polymer having mesogen moiety into small sections. An average diameter of each small section of the liquid crystal was 0.08 µm.

Then, the voltage-transmission characteristics of the liquid crystal optical switching element thus manufactured were evaluated using a light of 550 nm in wavelength and at a temperature of 25° C. As a result, the transmission factor thereof was 0.5% at the moment when no voltage was applied thereon and 90% maximum at the moment when a voltage (200 Vp, 60 Hz rectangular pulse) was applied thereon. The response time between the minimum/maximum transmission factors was less than 1 µs in both rise time and fall time. The temperature dependence of the voltage for half-wave retardation and of response time were also investigated, finding that they were substantially constant throughout the range of from 10° C. to 80° C.

Comparative Example I-1

A liquid crystal optical switching element was manufactured in the same manner as that of Example I-1 except that Kayarad R-526 (Nippon Kayaku Co., Ltd.) which is a polymer having no mesogen moiety was employed. When the temperature dependence of the voltage for half-wave retardation and response time of the resultant liquid crystal optical switching element was measured, they changed twice or more with changes in temperature of from 10° C. to 80° C.

Thus, it was confirmed that when a polymer having no mesogen moiety was employed, the display characteristics would change prominently depending on temperatures.

Comparative Example I-2

A liquid crystal optical switching element was manufactured in the same manner as that of Example I-1 except that the intensity of light irradiation was changed to 1 mW/cm$^2$ (365 nm). As a result, the diameter of the droplet of the liquid crystal became 1 µm, and the liquid crystal was turned into a scattered state at the moment when no voltage was applied thereon.

Thus, it was confirmed that when the diameter of the droplet of the liquid crystal was larger than 0.1 µm, the liquid crystal optical switching element could not be actuated according to the principle of this invention.

Example I-2

First of all, 60 wt % of a nematic liquid crystal BL 006 (Merck Co., Ltd.) and 40 wt % of a polymeric monomer: 1,4-di(4-(6-(acryloyloxy)hexyloxy)benzoyloxy) benzene were mixed together to obtain a mixed solution, to which 0.5 wt % (based on the aforementioned polymeric monomer) of a polymerization initiator: Irgacure 651 (Ciba Geigy Co., Ltd.) was added thereby to prepare a mixture.

Then, a liquid crystal optical switching element was manufactured in the same manner as that of Example I-1 except that this mixture was employed. An average diameter of each small section of the liquid crystal in this liquid crystal optical switching element was 0.08 µm.

Then, the voltage-transmission characteristics of the liquid crystal optical switching element thus manufactured were evaluated using a light of 550 nm in wavelength and at a temperature of 25° C. As a result, the transmission factor thereof was 0.5% at the moment when no voltage was applied thereon and 92% maximum at the moment when a voltage (190 Vp, 60 Hz rectangular pulse) was applied thereon. The response time between the minimum/maximum transmission factors was less than 1 µs in both rise time and fall time. The temperature dependence of the voltage for half-wave retardation and of response time were also investigated, finding that they were substantially constant throughout the range of from 10° C. to 80° C.

Example I-3

A couple of the liquid crystal optical switching elements manufactured according to Example I-1, three color polarizers, i.e. a red polarizer, a green polarizer and a blue polarizer, and an electron beam fluorescent tube were assembled together to manufacture a color image display device as shown in FIG. 5. When the display characteristics of this color image display device were evaluated, it was confirmed that the relationships between the voltage application of this couple of the liquid crystal optical switching elements and the colors of the transmitted light were the same as illustrated above with reference to FIG. 5.

When the liquid crystal optical switching elements were operated in synchronous with the raster generator 150 of the electron beam fluorescent tube 120 under the conditions of: 200V in voltage for half-wave retardation and 540 Hz rectangular pulse, it was confirmed that a color image free from color mixture could be obtained. Further, the display characteristics of the liquid crystal optical switching elements were found substantially constant throughout the temperature range of from 10° C. to 60° C.

Example I-4

First of all, 84 wt % of a nematic liquid crystal BL 035 (Merck Co., Ltd.), 15 wt % of methyl methacrylate monomer, 1 wt % of divinyl benzene as a crosslinking agent, and 1 wt % (based on the quantity of methyl methacrylate monomer) of methylbenzoyl peroxide as a polymerization initiator were mixed and dissolved together thereby to prepare a mixture. Then, a surfactant and pure water were added to this mixture, the resultant mixture being subsequently emulsified using a homogenizer. The resultant emulsion was then allowed to polymerize at a temperature of 90° C. for one hour thereby obtaining a liquid crystal mixture. Subsequently, this liquid crystal mixture was filtered and washed with pure water thereby manufacturing a microcapsule enclosing therein a liquid crystal material having an inner diameter of 0.08 µm. The resultant microcapsule was dispersed in 10% aqueous solution of isopropyl alcohol to obtain a 10% by weight dispersed solution of the microcapsule.

On the other hand, polyimide (AL-1051: JSR Co., Ltd.) was deposited through casting on the surface of one of the glass substrate (0.7 mm in thickness) to a thickness of 70 nm thereby forming an insulating film, on the surface of which the aforementioned dispersed solution was coated. Thereafter, the coated film of the dispersed solution was allowed to dry, thus laminating a layer of microcapsule. Further, a glass substrate (0.7 mm in thickness) bearing thereon the same kind of interdigitated electrode and the same kind of insulating film as employed in Example I-1 was prepared, and then, resinous spacer balls each having a diameter of 5 µm were distributed over this insulating film. Then, the resultant glass substrate was superimposed on the other glass substrate bearing thereon the aforementioned microcapsule layer in such a manner that the insulating film would contact with the microcapsule.

Finally, both glass substrates were thermally adhered to each other, and then a couple of polarizers were stuck on the top surface and bottom surface of the resultant cell in such a manner that the angle between the direction of electric field to be applied and the transmission axes of the polarizers becomes 45° and at the same time, the transmission axes thereof intersect orthogonally with each other, thereby accomplishing a liquid crystal optical switching element.

In the liquid crystal optical switching element obtained in this manner, the medium sandwiched between a pair of electrodes was constituted by a liquid crystal which was partitioned by means of the microcapsule into small sections. An average diameter of each small section of the liquid crystal was 0.08 µm.

Then, the voltage-transmission characteristics of the liquid crystal optical switching element thus manufactured were evaluated using a light of 550 nm in wavelength and at a temperature of 25° C. As a result, the transmission factor thereof was 0.5% at the moment when no voltage was applied thereon and 92% maximum at the moment when a voltage (180 Vp, 60 Hz rectangular pulse) was applied thereon. The response time between the minimum/maximum transmission factors was less than 1 µs in both rise time and fall time. The temperature dependence of the voltage for half-wave retardation and of response time were also investigated, finding that they were substantially constant throughout the range of from 10° C. to 60° C.

Example I-5

First of all, a porous glass substrate (10 µm in thickness) having an average pore size of 0.05 µm was manufactured by means of a sol-gel method. Thereafter, a nematic liquid crystal BL 035 (Merck Co., Ltd.) was kept sustained by this porous glass substrate. After the same kind of interdigitated electrode as that employed in Example I-1 was formed on one of the surfaces of the porous glass substrate, a couple of polarizers were stuck on both surfaces of the porous glass substrate in such a manner that the angle between the direction of electric field to be applied and the transmission axes of the polarizers becomes 45° and at the same time, the transmission axes thereof intersect orthogonally with each other, thereby accomplishing a liquid crystal optical switching element.

In the liquid crystal optical switching element obtained in this manner, the medium sandwiched between a pair of electrodes was constituted by a liquid crystal which was partitioned by means of the porous glass into small sections. An average diameter of each small section of the liquid crystal was 0.05 µm.

Then, the voltage-transmission characteristics of the liquid crystal optical switching element thus manufactured were evaluated using a light of 550 nm in wavelength and at a temperature of 25° C. As a result, the transmission factor thereof was 0.5% at the moment when no voltage was applied thereon and 92% maximum at the moment when a voltage (250 Vp, 60 Hz rectangular pulse) was applied thereon. The response time between the minimum/maximum transmission factors was less than 1 µs in both rise time and fall time. The temperature dependence of the voltage for half-wave retardation and of response time were also investigated, finding that they were substantially constant throughout the range of from 10° C. to 60° C.

EXAMPLE II

Figure 6A:
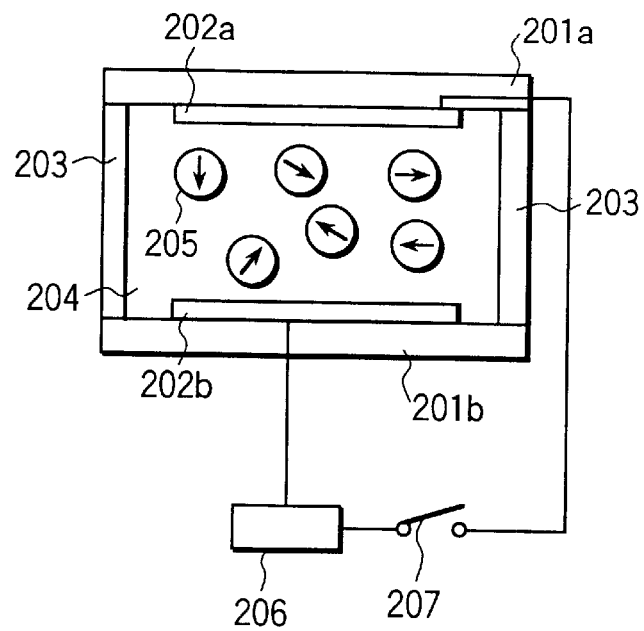
FIGS. 6A and 6B are partial sectional views each schematically illustrating the structure of another example of liquid crystal optical switching element according to this invention.
Figure 6B:
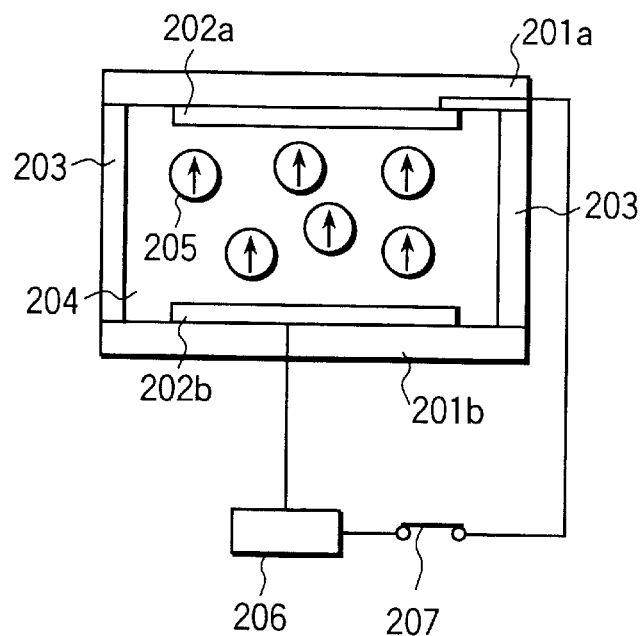

FIGS. 6A and 6B are partial sectional views each schematically illustrating another example of liquid crystal optical switching element according to this invention. In this example, the surfaces of a couple of substrates facing to each other are respectively provided with an electrode, and a medium consisting of a mixture comprising a network polymer, a liquid crystal and a coloring matter was employed. Namely, the liquid crystal material was constituted by a liquid crystal and a coloring matter.

First of all, the structure of liquid crystal optical switching element according to this invention and the manner of controlling of the optical characteristics of the optical switching element with an application of voltage will be explained with reference to FIGS. 6A and 6B. FIG. 6A shows a state of medium at the moment when no voltage is applied thereon, while FIG. 6B shows a state of medium at the moment when a voltage is applied thereon.

As shown in FIG. 6A, the medium 204 containing a polymer, a liquid crystal and a coloring matter is sandwiched between a substrate 201a provided with an electrode 202a and a substrate 201b which is provided with an electrode 202b, the substrate 201b being disposed to spacingly face from the substrate 201a. The distance between these two substrates 201a and 201b is maintained by means of a spacer 203. The application of voltage to the medium 204 is performed through the electrodes 202a and 202b by means of an electric circuit 206 and a switch 207.

At the moment when no voltage is applied as shown in FIG. 6A, the medium 204 containing a polymer, a liquid crystal material and a coloring matter is postured, when macroscopically observed, to have an optically isotropic phase. Therefore, an incident light can be absorbed by the coloring molecule, thus rendering the optical switching element to take an absorptive state. However, when it is microscopically observed, a large number of micro-regions 205 which are well aligned in orientation of the liquid crystal molecule can be recognized even though the correlation length thereof is relatively short. As shown in FIG. 6A, although the alignment direction of each of these micro-regions 205 is random, the generation of scattering of light is not recognized at the moment when no voltage is applied thereon, since the size of this micro-region 205 is sufficiently smaller than the wavelength of the visible light.

At the moment when a voltage is applied, as shown in FIG. 6B, the alignment direction of each of these micro-regions 205 is aligned in the direction of electric field, thus rendering the medium 204 to turn into an optically anisotropic phase. Therefore, the coloring molecule is also aligned in the direction of electric field, thus rendering the optical switching element to take a transmissive state. By the way, it is also possible to form an intermediate state between the absorptive state and the transmissive state by suitably changing the intensity of the electric field. This large number of micro-regions 205 whose alignment direction is random are assumed to be formed by a mechanism as explained below.

Namely, since the polymer and liquid crystal molecule can be uniformly mixed with each other on a molecular scale, the correlation length between liquid crystal molecules is caused to prominently decreased, thus rendering the medium to take an isotropic phase as macroscopically observed even if the medium is of liquid crystal structure as observed microscopically.

Next, the construction of a color liquid crystal optical switching element and also of a color image display device, both being formed using a liquid crystal optical switching element of this invention, will be explained with reference to FIGS. 7 and 8.

Figure 7:
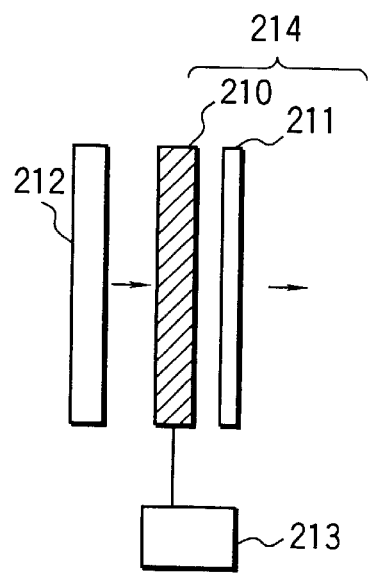
FIG. 7 is a diagram schematically illustrating another example of the color image display device according to this invention.

FIG. 7 illustrates a color image display device comprising a liquid crystal optical switching element 210 of this invention, a color filter 211 and a white light emitting body 212. A color liquid crystal optical switching element 214 is constituted by the liquid crystal optical switching element 210 and the color filter 211. The liquid crystal optical switching element 210 of this invention which is employed in this case carries thereon a black coloring matter. The incident light transmitted from the white light emitting body 212 to the liquid crystal optical switching element 210 is passed through or absorbed by the liquid crystal optical switching element 210. The light passed through the liquid crystal optical switching element 210 advances forward through the color filter 211. When an image information is transmitted from an electric circuit 213 to the liquid crystal optical switching element 210, a color image display device will be realized.

Figure 8:
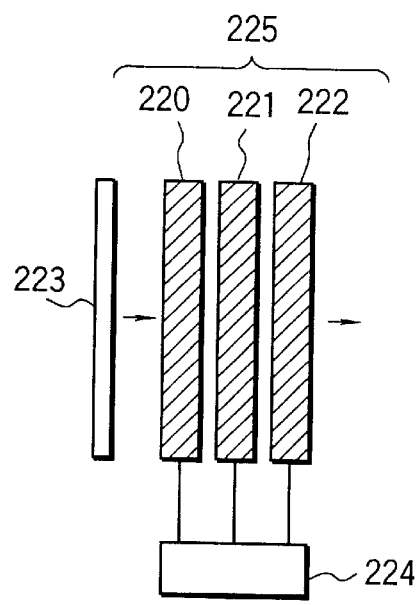
FIG. 8 is a diagram schematically illustrating still another example of the color image display device according to this invention.

FIG. 8 illustrates an example of constituting a color liquid crystal optical switching element and a color image display device by employing a 3-ply layer of the liquid crystal optical switching element of this invention without employing a color filter. Each of the liquid crystal optical switching elements 220, 221 and 222 carries thereon a coloring matter which is capable of absorbing red, green or blue, or cyan, magenta or yellow, and hence a color liquid crystal optical switching element 225 is constituted by these three liquid crystal optical switching elements. The incident light transmitted from the white light emitting body 223 to the color liquid crystal optical switching element 225 is controlled as to the absorption/transmission of each color by means of an electric circuit 224. When an image information of each color is fed through the electric circuit 224, a color image display device will be realized.

Figure 9:
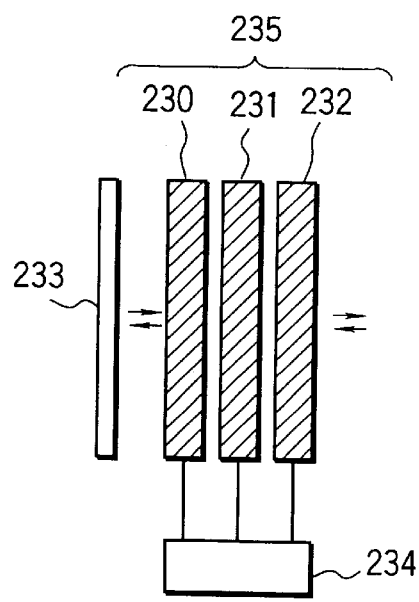
FIG. 9 is a diagram schematically illustrating a further example of the color image display device according to this invention.

FIG. 9 illustrates an example of constituting a color liquid crystal optical switching element of reflection type and a color image display device of reflection type by making use of the liquid crystal optical switching element of this invention wherein a reflector 233 is mounted thereon in place of the white light emitting body 223. According to this example, a reflected light is controlled in the same manner basically as the method employed in the example shown in FIG. 8.

Figure 10:
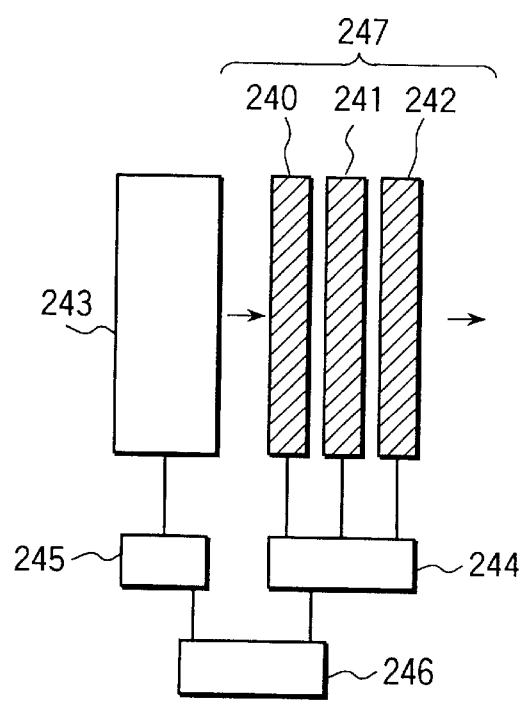
FIG. 10 is a diagram schematically illustrating a still another example of the color image display device according to this invention.

FIG. 10 illustrates an example of constituting a color image display device by employing a 3-ply layer of the liquid crystal optical switching element of this invention. Each of the liquid crystal optical switching elements 240, 241 and 242 carries thereon a coloring matter which is capable of absorbing red, green or blue, or cyan, magenta or yellow, and hence a color liquid crystal optical switching element 247 is constituted by these three liquid crystal optical switching elements. The color liquid crystal optical switching element 247 is connected with an electric circuit 244. While the white electron beam fluorescent tube 243 is connected with a raster generator 245. Further, in order to ensure a synchronization between the electric circuit 244 and the raster generator 245, a synchronous circuit 246 is connected respectively with the electric circuit 244 and with the raster generator 245.

Since the raster generator 245 for the monochrome electron beam fluorescent tube 243 is made synchronous with the electric circuit 244 of the color liquid crystal optical switching element 247 by making use of the synchronous circuit 246, the selection of display color as well as the generation of monochrome image can be performed, and at the same time, the switching of display colors can be performed at high speed, thus making it possible to realize a color image display device.

This invention will be further explained with reference to the following specific examples. Example II-1

First of all, a pair of glass substrates(0.7 mm in thickness) each bearing an ITO electrode on the surface thereof were prepared. Then, polyimide (AL-1051: JSR Co., Ltd.) was deposited as an insulating film on the surface, bearing electrode, of the substrate to a thickness of 70 nm, thus forming a couple of substrates, i.e. a first substrate and a second substrate. Then, silica spacer balls each having a diameter of 5 $\mu$m was distributed over the insulating film of the first substrate. On the other hand, an epoxy resin adhesive was coated on a predetermined position of the insulating film of the second substrate for laminating it with the first substrate.

Thereafter, these first and second substrates were superimposed with the insulating films thereof being faced to each other, and then sealed in an oven thereby to obtain an empty cell.

On the other hand, 58 wt % of a nematic liquid crystal BL 035 (Merck Co., Ltd.), 37 wt % of a polymeric monomer: 1,4-di(4-(6-(acryloyloxy)hexyloxy)benzoyloxy)-2-methyl benzene, and 5 wt % of a black coloring matter D86 (Merck Co., Ltd.) were mixed together to obtain a mixed solution, to which 0.5 wt % (based on the aforementioned polymeric monomer) of a polymerization initiator: Irgacure 651 (Ciba Geigy Co., Ltd.) was added thereby to prepare a mixture.

The mixture thus obtained was introduced into the aforementioned empty cell by means of a conventional method, and then ultraviolet rays were irradiated onto the liquid crystal cell by making use of a high pressure mercury lamp while keeping the aforementioned mixture in a state of isotropic phase. In this irradiation, the intensity of irradiated light was set to 100 mW/cm$^2$ (365 nm) and the irradiation time was set to one minute.

In the liquid crystal optical switching element obtained in this manner, the medium sandwiched between a pair of electrodes was constituted by a liquid crystal material comprising a liquid crystal and a coloring matter and by a polymer partitioning the region of the liquid crystal material into small sections. An average diameter of each small section of the liquid crystal material was 0.07 $\mu$m.

Then, the voltage-transmission characteristics of the liquid crystal optical switching element thus manufactured were evaluated using a white light source and at a temperature of 25° C. As a result, the transmission factor thereof was 0.5% at the moment when no voltage was applied thereon and 90% maximum at the moment when a voltage (100 Vp, 60 Hz rectangular pulse) was applied thereon. The transmission factor changed continuously in conformity with changes in voltage applied. The response time between the minimum/maximum transmission factors was less than 10 $\mu$s in both rise time and fall time. The temperature dependence of the threshold voltage and of response time were also investigated, finding that they were substantially constant throughout the range of from 10° C. to 60° C.

Example II-2

First of all, 58 wt % of a nematic liquid crystal BL 006 (Merck Co., Ltd.), 37 wt % of a polymeric monomer: 1,4-di(4-(6-(acryloyloxy)hexyloxy)benzoyloxy) benzene and 5 wt % of a black coloring matter D86 (Merck Co., Ltd.) were mixed together to obtain a mixed solution, to which 0.5 wt % (based on the aforementioned polymeric monomer) of a polymerization initiator: Irgacure 651 (Ciba Geigy Co., Ltd.) was added thereby to prepare a mixture.

Then, a liquid crystal optical switching element was manufactured in the same manner as that of Example II-1 except that this mixture was employed. An average diameter of each small section of the liquid crystal in this liquid crystal optical switching element was 0.07 $\mu$m.

Then, the voltage-transmission characteristics of the liquid crystal optical switching element thus manufactured were evaluated using a white light source and at a temperature of 25° C. As a result, the transmission factor thereof was 0.5% at the moment when no voltage was applied thereon and 92% maximum at the moment when a voltage (90 Vp, 60 Hz rectangular pulse) was applied thereon. The response time between the minimum/maximum transmission factors was less than 10 $\mu$s in both rise time and fall time. The temperature dependence of the threshold voltage and of response time were also investigated, finding that they were substantially constant throughout the range of from 10° C. to 60° C.

Example II-3

First of all, 80 wt % of a nematic liquid crystal BL 035 (Merck Co., Ltd.), 4 wt % of a black coloring matter D86 (Merck Co., Ltd.), 15 wt % of methyl methacrylate monomer, 1 wt % of divinyl benzene as a crosslinking agent, and 1 wt % (based on the quantity of methyl methacrylate monomer) of methylbenzoyl peroxide as a polymerization initiator were mixed and dissolved together thereby to prepare a mixture. Then, a surfactant and pure water were added to this mixture, the resultant mixture being subsequently emulsified using a homogenizer. The resultant emulsion was then allowed to polymerize at a temperature of 90° C. for one hour thereby obtaining a liquid crystal mixture. Subsequently, this liquid crystal mixture was filtered and washed with pure water thereby manufacturing a microcapsule enclosing therein a liquid crystal material having an inner diameter of 0.08 $\mu$m. The resultant microcapsule was dispersed in 10% aqueous solution of isopropyl alcohol to obtain a 10% by weight dispersed solution of the microcapsule.

On the other hand, a pair of glass substrates (0.7 mm in thickness) each bearing an ITO electrode on the surface thereof were prepared. Then, polyimide (AL-1051: JSR Co., Ltd.) was deposited as an insulating film on the surface, bearing electrode, of the substrate to a thickness of 70 nm, thus forming a couple of substrates, i.e. a first substrate and a second substrate. Then, the aforementioned dispersed solution was coated on the surface of the insulating film of the first substrate and then allowed to dry thereby to laminate a layer of microcapsule. Further, resinous spacer balls each having a diameter of 5 $\mu$m was distributed over the surface of the second substrate.

Then, the second substrate was superimposed on the first substrate bearing thereon the aforementioned microcapsule layer in such a manner that the insulating film of the second substrate would contact with the microcapsule.

Finally, both substrates were thermally adhered to each other, thereby accomplishing a liquid crystal optical switching element.

In the liquid crystal optical switching element obtained in this manner, the medium sandwiched between a pair of electrodes was constituted by a liquid crystal material comprising a liquid crystal and a coloring matter and by the microcapsule partitioning the region of the liquid crystal material into small sections. An average diameter of each small section of the liquid crystal material was 0.08 $\mu$m.

Then, the voltage-transmission characteristics of the liquid crystal optical switching element thus manufactured were evaluated using a white light source and at a temperature of 25° C. As a result, the transmission factor thereof was 0.5% at the moment when no voltage was applied thereon and 92% maximum at the moment when a voltage (90 Vp, 60 Hz rectangular pulse) was applied thereon. The response time between the minimum/maximum transmission factors was less than 10 $\mu$s in both rise time and fall time. The temperature dependence of the threshold voltage and of response time were also investigated, finding that they were substantially constant throughout the range of from 10° C. to 60° C.

Example II-4

First of all, a porous glass substrate (10 $\mu$m in thickness) having an average pore size of 0.05 $\mu$m was manufactured by means of a sol-gel method. Thereafter, a mixture comprising 95 wt % of a nematic liquid crystal BL 035 (Merck Co., Ltd.) and 5 wt % of a black coloring matter D86 (Merck Co., Ltd.) was kept sustained by this porous glass substrate. Then, an ITO electrode was formed on both surfaces of this porous glass substrate by means of sputtering, thereby accomplishing a liquid crystal optical switching element.

In the liquid crystal optical switching element obtained in this manner, the medium sandwiched between a pair of electrodes was constituted by a liquid crystal material comprising a liquid crystal and a coloring matter and by the porous glass partitioning the region of the liquid crystal material into small sections. An average diameter of each small section of the liquid crystal material was 0.05 $\mu$m.

Then, the voltage-transmission characteristics of the liquid crystal optical switching element thus manufactured were evaluated using a white light source and at a temperature of 25° C. As a result, the transmission factor thereof was 0.5% at the moment when no voltage was applied thereon and 92% maximum at the moment when a voltage (180 Vp, 60 Hz rectangular pulse) was applied thereon. The response time between the minimum/maximum transmission factors was less than 10 $\mu$s in both rise time and fall time. The temperature dependence of the threshold voltage and of response time were also investigated, finding that they were substantially constant throughout the range of from 10° C. to 60° C.

Example II-5

Three kinds of liquid crystal optical switching elements were manufactured in the same manner as that of Example II-1 except that a yellow coloring matter G232 (Japanese Research Institute for Photosensitizing Dyes Co., Ltd.), a magenta coloring matter G176 (Japanese Research Institute for Photosensitizing Dyes Co., Ltd.), or a cyan coloring matter G472 (Japanese Research Institute for Photosensitizing Dyes Co., Ltd.) was employed in place of the black coloring matter D86 (Merck Co., Ltd.).

These three kinds of liquid crystal optical switching elements were stacked in the direction of light transmission thereby to obtain a color liquid crystal optical switching element. Then, this color liquid crystal optical switching element was combined with a white light emitting body thereby to manufacture a color image display device. This color image display device was confirmed, through an application of voltage to each of the liquid crystal switching element, as being capable of displaying a color image.

Example II-6

Three kinds of liquid crystal optical switching elements manufactured in Example II-5 were stacked in the direction of light transmission thereby to obtain a color liquid crystal optical switching element. Then, this color liquid crystal optical switching element was combined with an electron beam fluorescent tube comprising a mixed fluorescent body containing red, green and blue fluorescencers thereby to manufacture a color image display device as shown in FIG. 10.

When this color liquid crystal optical switching element was operated in synchronous with the raster generator 245 of the monochrome electron beam fluorescent tube 243 under the conditions of: 100V in voltage for half-wave retardation and 540 Hz rectangular pulse, it was confirmed that a color image free from color mixture could be obtained. Further, the display characteristics of the liquid crystal optical switching elements were found substantially constant throughout the operating temperature range of from 10° C. to 60° C.

As explained above, it is possible according to this invention to provide a liquid crystal optical switching element which is high in speed and wide in viewing angle. Further, it is also possible according to this invention to provide a liquid crystal optical switching element which is high in speed and in light utilization efficiency, and wide in viewing angle. Since the liquid crystal optical switching element according to this invention is excellent in characteristics overcoming substantially all of the problems of the prior art, it is suited for use in a color shutter and a color image display device, and hence the liquid crystal optical switching element of this invention would be very valuable in industrial viewpoint.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A liquid crystal optical switching element comprising:
   a pair of polarizers disposed to face each other with a space being interposed therebetween;
   a pair of substrates interposed between said pair of polarizers and disposed to face each other with a space being interposed therebetween;
   a medium interposed between said pair of substrates and composed of a liquid crystal material partitioned into small sections, and a material for partitioning a region of said liquid crystal material into said small sections selected from the group consisting of a network polymer and a microcapsule; and
   voltage-applying means to apply a voltage to said medium;
   wherein said medium is optically isotropic at the moment when no voltage is applied to said medium and capable of exhibiting an optical anisotropy which is proportional to a square of electric field intensity when a voltage is applied to said medium, and
   said liquid crystal material occupies more than 50% of said medium.

2. A liquid crystal optical switching element comprising:
   a pair of polarizers disposed to face each other with a space being interposed therebetween;
   a pair of substrates interposed between said pair of polarizers and disposed to face each other with a space being interposed therebetween;
   a medium interposed between said pair of substrates and composed of a liquid crystal material partitioned into small sections, and a material for partitioning a region of said liquid crystal material into said small sections selected from the group consisting of a network polymer and a microcapsule; and
   voltage-applying means to apply a voltage to said medium;
   wherein an average diameter of each of said small sections of liquid crystal material is 0.1 $\mu$m or less, and said medium is optically isotropic at the moment when no voltage is applied to said medium and capable of exhibiting an optical anisotropy which is proportional to a square of electric field intensity when a voltage is applied to said medium, and
   said liquid crystal material occupies more than 50% of said medium.

3. The liquid crystal optical switching element according to claim 2, wherein said material for partitioning a region of said liquid crystal material into said small sections is a network polymer which is composed of a photo-setting resin.

4. The liquid crystal optical switching element according to claim 2, wherein said material for partitioning a region of said liquid crystal material into said small sections is a network polymer which is composed of acrylic resin.

5. The liquid crystal optical switching element according to claim 2, wherein a refractive anisotropy $\Delta n$ of said liquid crystal material is 0.1 or more.

6. The liquid crystal optical switching element according to claim 2, wherein a dielectric anisotropy $\Delta\epsilon$ of said liquid crystal material is 5 or more.

7. The liquid crystal optical switching element according to claim 2, wherein a direction of voltage to be applied by means of said voltage-applying means is substantially orthogonal with a direction of light transmission.

8. A liquid crystal optical switching element comprising:
   a pair of substrates disposed to face each other with a space being interposed therebetween;
   a medium interposed between said pair of substrates and composed of a liquid crystal material partitioned into small sections, and a material for partitioning a region of said liquid crystal material into said small sections; and
   voltage-applying means to apply a voltage to said medium;

wherein said liquid crystal material contains a liquid crystal and a coloring matter;

said medium is optically isotropic and absorbs a visible light at the moment when no voltage is applied to said medium, and, when a voltage is applied to said medium, is capable of exhibiting an optical anisotropy which is proportional to a square of electric field intensity and allows a visible light to pass therethrough;

an average particle diameter of said liquid crystal material partitioned into small sections is 0.1 μm or less, and said material for partitioning a region of said liquid crystal material into said small sections is selected from the group consisting of a network polymer, a microcapsule, and a porous inorganic material; and a direction of voltage to be applied by said voltage-applying means is substantially parallel with a direction of light transmission.

9. The liquid crystal optical switching element according to claim 8, wherein said material for partitioning a region of said liquid crystal material into said small sections is a network polymer which is composed of a photo-setting resin.

10. The liquid crystal optical switching element according to claim 8, wherein said material for partitioning a region of said liquid crystal material into said small sections is a network polymer which is composed of acrylic resin.

11. The liquid crystal optical switching element according to claim 8, wherein a dielectric anisotropy $\Delta\epsilon$ of said liquid crystal material is 5 or more.

12. The liquid crystal optical switching element according to claim 8, wherein said coloring matter is 5 or more in dichroic ratio.

* * * * *